(No Model.) 3 Sheets—Sheet 3.
A. F. HJORT.
MACHINE FOR ORNAMENTING BILLIARD CUE HANDLES, &c.
No. 395,494. Patented Jan. 1, 1889.
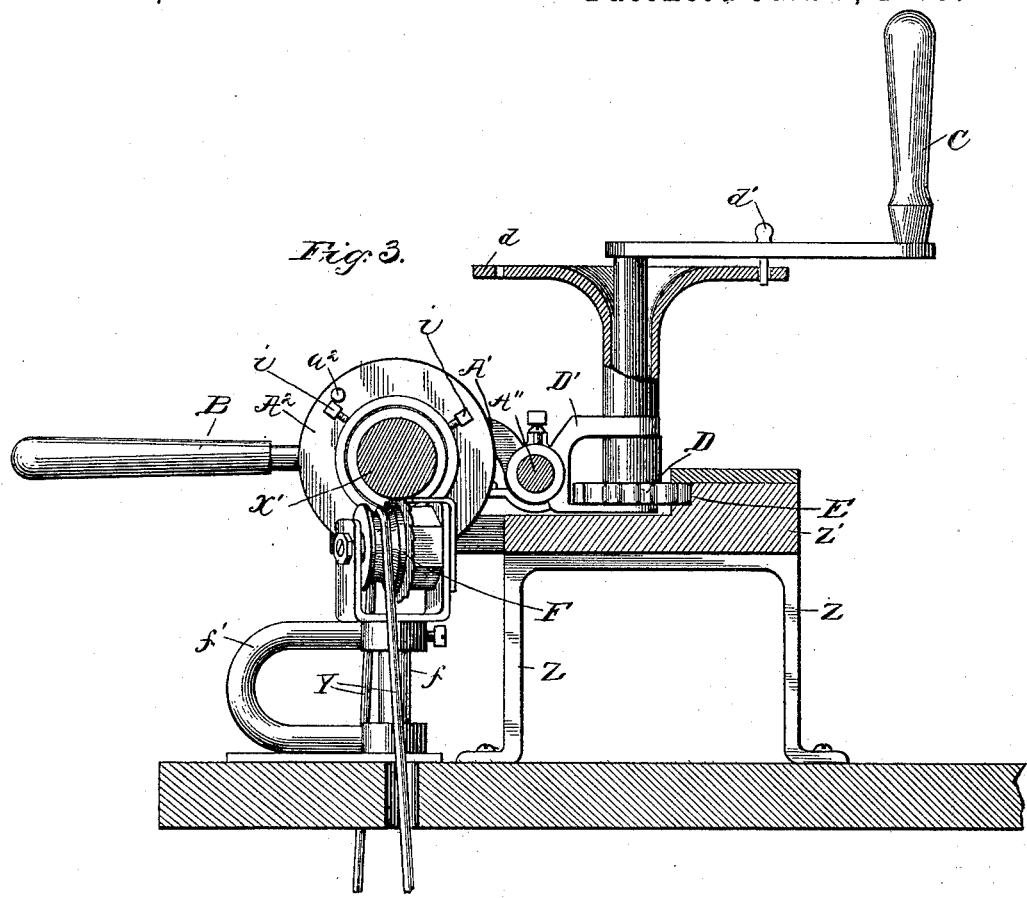
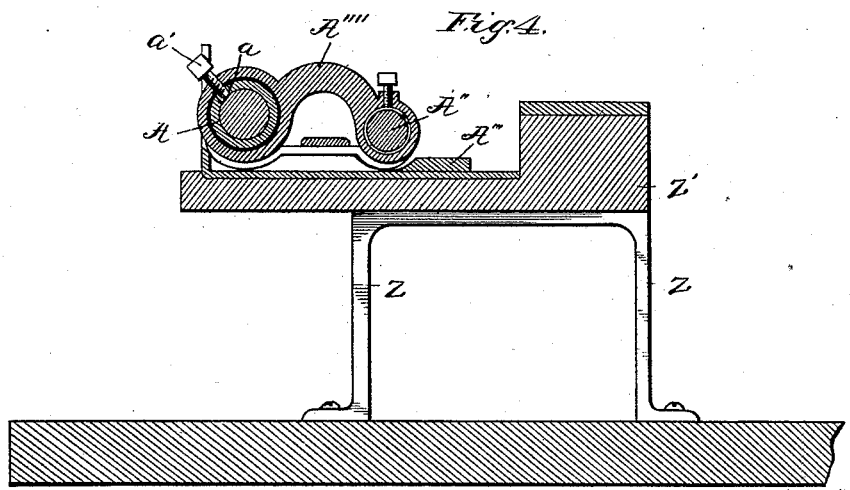
Witnesses.
Wm R Rheem.
Flora L. Brown.
Inventor.
Axel F. Hjort,
By Charles J. Brown
Atty.

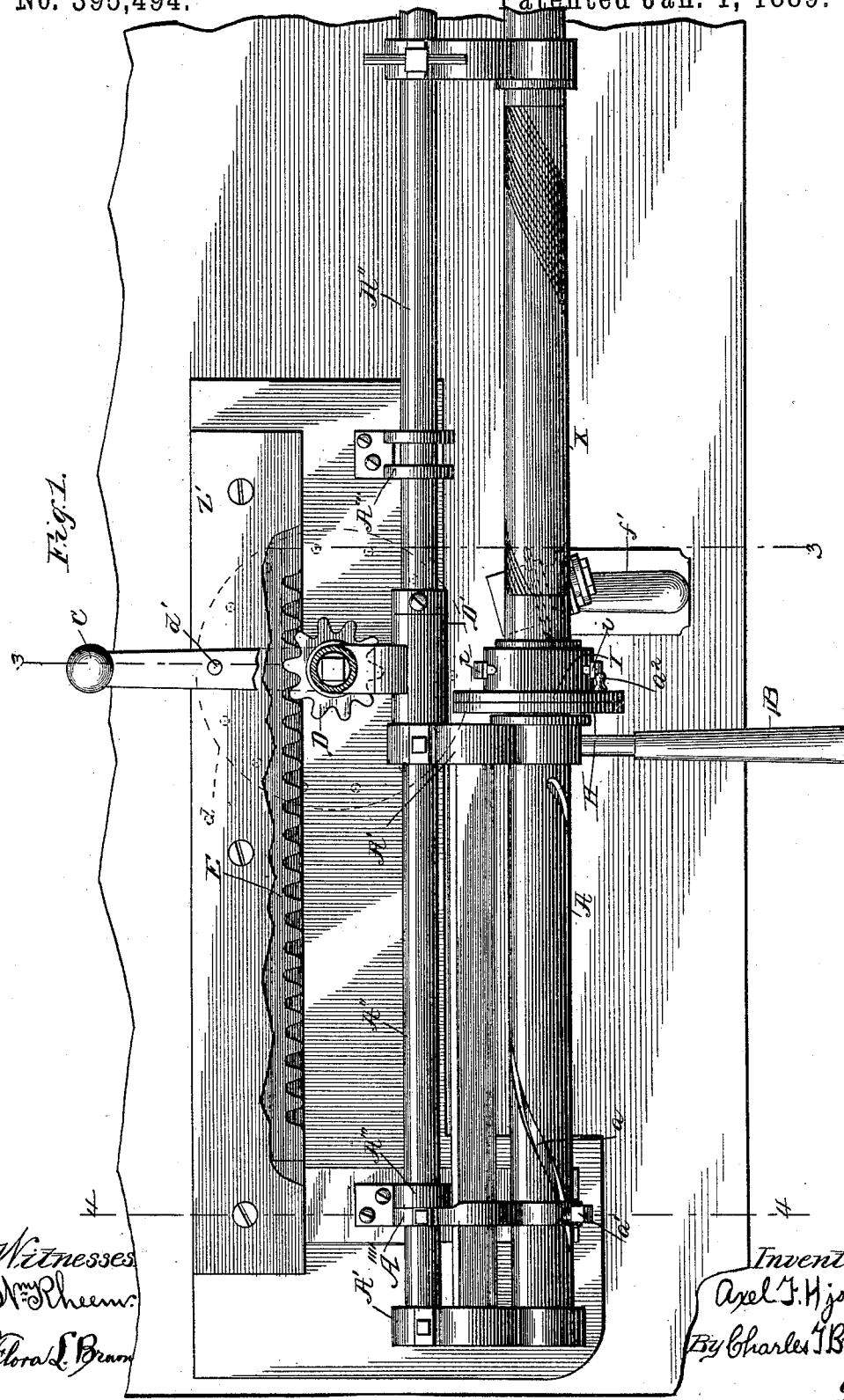

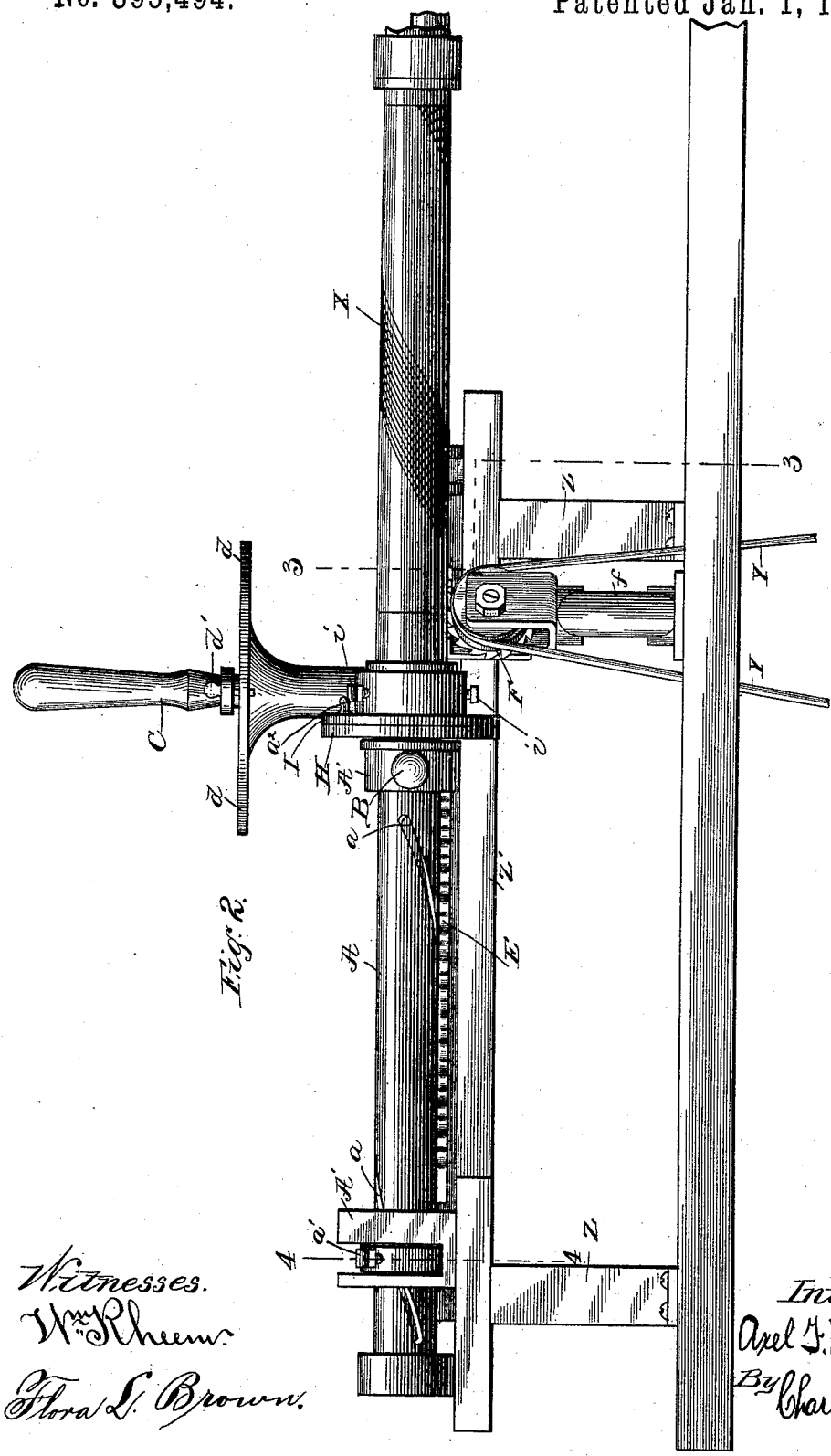

UNITED STATES PATENT OFFICE.

AXEL F. HJORT, OF CHICAGO, ILLINOIS, ASSIGNOR TO THE BRUNSWICK-BALKE-COLLENDER COMPANY, OF SAME PLACE.

MACHINE FOR ORNAMENTING BILLIARD-CUE HANDLES, &c.

SPECIFICATION forming part of Letters Patent No. 395,494, dated January 1, 1889.

Application filed January 3, 1888. Serial No. 259,681. (No model.)

*To all whom it may concern:*

Be it known that I, AXEL F. HJORT, a subject of the King of Sweden, now and for several years last past a resident of Chicago, in the county of Cook and State of Illinois, have invented certain new and useful Improvements in Machines for Ornamenting Billiard-Cue Handles and for other Analogous Purposes; and the following, taken in connection with the drawings accompanying and forming a part hereof, is a full and complete description thereof, sufficient to enable those skilled in the art to manufacture and use the same.

My invention has for its object the production of means whereby a handle suitable for a billiard-cue may be roughened and ornamented by a series of grooves therein, either running in a spiral direction to the right and to the left around said handle or by a series of like grooves running around said handle at right angles, or nearly so, to the axis thereof, and also a series of grooves running parallel to said axis.

I have illustrated my invention by the drawings hereinbefore mentioned, in which—

Figure 1 is a plan view. Fig. 2 is a front elevation. Fig. 3 is a cross-section on line 3 3 of Fig. 2, and Fig. 4 is a cross-section on line 4 4 of Fig. 2.

Like letters refer to like parts throughout the several views.

X is the handle of a billiard-cue partially ornamented or roughened by my invention.

Y is a belt running the saw F, used by me in ornamenting handles, X, made of hard wood. If handle X is of soft wood, a knife may be used in place of said saw F, and belt Y is then dispensed with.

Z are legs of the frame Z' of my machine.

A is a metal shaft revolving freely in bearings in frame A' A', and has cut therein spiral groove $a$. Frame A' moves or slides horizontally with rod A'' in guides A'''. A'''' is a frame pivotally placed on one of guides A''', as illustrated in Fig. 4. In frame A'''' there is placed set-screw $a'$, which may be turned forward by means of the thread thereon sufficiently to engage with spiral groove $a$ on shaft A, being thereby adjustable in said groove, and when set-screw $a'$ is thus engaging with groove $a$ of shaft A the horizontal movement of frame A' and rod A'', frame A'''' remaining stationary, will cause a rotating movement to be imparted to shaft A either to the right or left corresponding with the groove $a$ on said shaft A. The horizontal movement referred to in shaft A is produced by me by the turning of crank C, to the shaft of which is secured gear-wheel D, engaging with stationary rack E. The shaft to which wheel D and crank C are secured turns freely in frame D', and frame D' is placed on rod A'' in a manner to allow said rod A'' to turn freely in frame D'.

On frame D' there is secured horizontal disk $d$, (illustrated on Figs. 2 and 3,) and a pin, $d'$, in handle C fits into holes in disk $d$, so that a measured part of a complete turn may be given at any time to said handle C, and thus a given horizontal movement of shaft A and rod A'' secured.

Handle B is secured in frame A', and thus shaft A may be raised or caused to partially turn about rod A'', said rod A'' turning in bearings in guides A'''. At one end of shaft A is secured disk H, having a row of holes therein around the face thereof in like manner as has disk $d$, hereinbefore described.

Disk H is placed face to face with disk I, journaled so it may turn with disk H or upon the same center, and when pin $a^2$, which passes through a hole in disk I, is engaged in any one of the circles of holes in disk H said disks I and H do turn in unison. Disk I has a hollow or hole, X', on the face thereof, into which handle, X, to be ornamented by my machine passes, fitting tightly and rotating therewith, being secured firmly therein by set-screws $i\ i$. Saw F may be turned to any desired angle relative to the axis of handle X by standard $f f'$.

The operation of my machine is as follows: A handle X is placed in hole X' of disk I and secured therein by set-screws $i\ i$. Saw F, if handle X be of hard wood, is placed in standard $f f'$ and made to rapidly revolve by belt Y. Shaft A, rod A'', and handle X, secured, as described, in disk I, are given a horizontal movement by the turning of crank C and gear D in fixed rack E, and the saw F is adjusted so as to cut a groove of any desired depth in handle X. As handle X and shaft A move horizontally, as described, a rotary movement is imparted to said shaft A and handle X, when set-screw $a'$ meshes or engages with groove $a$. When said shaft A and handle X have moved to the extreme left point allowed by the machine, said shaft and handle are raised by handle B, the handle X being thereby lifted from the saw F, and by the turning of handle C to the right the said shaft A and handle X are returned to their original position. Pin $a^2$ in disk I is then withdrawn from the hole in which it is placed in disk H and placed back in the next hole, and then by turning of crank C to the left the shaft A and handle X are again moved horizontally to the extreme left, as before, and rotating as before if set-screw $a'$ engages with groove $a$ on said shaft A. In this manner a second groove or spiral parallel to the first-described groove is cut or sawed in handle X. If handle X be of soft wood, saw F is replaced by an ordinary cutting tool or knife. If it be desired, as it usually is by me, to cut a series of like spirals, but running in a contrary direction around handle X, intersecting the hereinbefore-described spirals, shaft A is removed and replaced with a like shaft, A, having a groove, $a$, running in a contrary direction around said shaft; and if it be desired to have the grooves in handle X parallel with the axis of the handle the set-screw $a'$ is turned out of groove $a$ by means of the screw-threads thereon, so as to be free therefrom, and shaft A, with disk H thereon, clamped firmly in position, so as not to rotate in frame A', handle X being turned by the pin $a^2$ being placed in rotation in the holes in disk H as each of the parallel grooves in said handle X is cut, and in case like grooves are desired in said handle X at right angles to the axis thereof pin $d'$ in handle C is placed in a hole in disk $d$ and a complete revolution of shaft A and handle X is made while saw F is in contact with said handle, after which the handle X is raised from said saw and pin $d'$ placed in the next hole of disk $d$, a measured horizontal movement being thus given shaft A and handle X, when handle X and shaft A are again given a rotary motion. In the making of the grooves around handle X, as well as in the making of the grooves parallel to the axis of said handle, the set-screw $a'$ is not engaged with groove $a$ of shaft A.

Having thus described my invention, what I claim, and desire to secure by Letters Patent, is—

1. In a machine for ornamenting billiard-cue handles and for other analogous purposes, a shaft having a groove cut thereon, said shaft rotating freely in a frame adapted to move horizontally in guides, and a set-screw fitting adjustably in said groove, in combination with concentric disks, one of said disks secured to said rotatory shaft and adjustably connected to the other of said disks, means in said last-named disk for securing thereto a billiard-cue or other material, and a cutting-tool adapted to engage therewith, all substantially as described.

2. In a machine for ornamenting billiard-cue handles and for other like purposes, the combination of a shaft having a groove thereon, said shaft turning freely in a frame adapted to move horizontally, a set-screw adjustably fitting said groove, whereby the horizontal movement of the frame and shaft will produce rotary movement in said shaft when said set-screw is engaged therewith, a disk secured to said rotatory shaft, a concentric disk adjustably attached to said first-named disk, and with means for securing therein a billiard-cue handle or other analogous material, a cutting-tool adapted to engage with such material, a handle secured to said horizontally-moving frame, and a handle actuating a gear secured in said horizontally-moving frame, intermeshing with an immovable gear-rack, whereby a horizontal movement may be given said frame by either of said handles, all substantially as described, and for the purpose set forth.

3. In a machine for ornamenting billiard-cue and other handles, the combination of a shaft rotating freely in a horizontally-moving frame, a disk concentric with said shaft, to which a billiard-cue handle or other analogous material may be secured, a cutting-tool adapted to engage with said material, said disk attached to said rotatory shaft and rotating therewith, a handle actuating a gear secured in said horizontally-moving frame, said gear intermeshing with an immovable gear-rack, and an immovable disk having holes therein, with which a pin in said handle adjustably engages, whereby the said horizontally-moving frame, together with the material secured to said disk, may be horizontally moved at regular intervals, all substantially as described.

AXEL F. HJORT.

Witnesses:
CHARLES T. BROWN,
FLORA L. BROWN.